United States Patent Office 3,671,181
Patented June 20, 1972

---

3,671,181
PROCESS FOR THE PRODUCTION OF PRINTS AND PAD-DYEINGS FAST TO RUBBING WITHOUT REQUIRING AN AFTER - TREATMENT ON NITROGEN-CONTAINING FIBROUS MATERIALS
Erich Feess and Sienling Ong, Lorsbach, Taunus, Germany, assignors to Farbwerke Hoechst Aktiengesellschaft vormals Meister Lucius & Bruning, Frankfurt am Main, Germany
No Drawing. Filed May 28, 1970, Ser. No. 41,587
Claims priority, application Germany, June 25, 1969,
P 19 32 149.4
Int. Cl. D06p 5/02
U.S. Cl. 8—165           5 Claims

---

ABSTRACT OF THE DISCLOSURE

Process for the production of prints and pad-dyeings fast to rubbing without requiring an after-treatment on nitrogen-containing fibrous materials, by using printing pastes or padding baths which contain, in addition to dyestuffs suitable for these fiber types as well as emulsion thickenings, also aqueous dispersions of styrene homopolymers, and fixing the prints and pad-dyeings by a treatment with steam and/or hot air and/or by exposure to radiation energy.

---

The present invention relates to a process for the production of prints and pad-dyeings on nitrogen-containing fibrous materials, which are fast to rubbing without requiring an after-treatment.

It is known that prints and pad-dyeings can be produced on fabrics, yarns or carpet goods made of polyamide, polyurethane or other nitrogen-containing fibers with the dyestuffs suitable for the corresponding materials. When this process is put into practice, dyestuff solutions or dispersions are used, the consistency of which is increased by an addition of thickeners, and thus bleeding of the prints caused by the capillary forces of the fiber is prevented. The production of a pad-dyeing is facilitated when the dyestuff solutions or dispersions are applied to the goods in the presence of a thickener. The thickeners generally used for this purpose are substances which, even at a low concentration, provide solutions of high viscosity in an aqueous medium, owing to their relatively high solids content, for example starch, tragacanth, salts of alginic acid. However, the use of such thickeners rich in solids gives rise to a stiff feel of the goods after the drying of the prints or pad-dyeings and fixing of the dyestuffs on the dyed materials, which can be only removed by an after-treatment. Since in most cases, the stiff portions are additionally of colored nature, a mechanical after-treatment, for example by brushing the printed material, is not sufficient to remove them. A wet treatment, however, requires a subsequent drying of the goods which substantially raises the processing costs.

When thickeners poor in solids based upon emulsions are used for the production of prints and pad-dyeings, the goods are not given a stiff feel. Such emulsions thickenings are obtained by emulsifying a liquid which is not miscible with water, for example xylene, gasoline, chlorobenzene and other hydrocarbons, in an aqueous medium ("oil-in-water" emulsion) or, alternatively, they may be prepared in such a manner that, in the dyestuff preparations, the aqueous medium forms the inner disperse phase and the liquid which is not miscible with water forms the outer coherent phase ("water-in-oil" emulsion). Both types of emulsion thickenings have to be prepared with emulsifiers. Emulsifiers for "water-in-oil" emulsions are disclosed, for example, in German Pats. Nos. 958,380 and 965,722.

However, even when thickeners poor in solids are used, it is not possible to do without a wet after-treatment of the printed goods since most organic dyestuffs are of lipophilic nature and undergo dissolution in the mostly organic, sparingly volatile or wax-like emulsifier portions that remain on the goods, so that the dyestuffs show a tendency to bleeding after some time of storage or use under the influence of temperature and due to the capillary forces of the fiber. This blurs the sharp outlines of the printed pattern, and prints of different shades may even migrate into one another. Storage in heated rooms may accelerate this migration of the colored zones and accordingly intensify the risk of staining so that the goods become finally useless.

According to a process known as "pigment printing," the above disadvantages may be overcome by incorporating the dyestuffs in a synthetic resin film, but this process has the disadvantage of allowing only fabrics of preferably a plane surface to be printed or padded. This process is, therefore, not suitable for goods, the rough (hairy) surface of which have to be treated with care, for example carpets or velvet. Thus, the "pigment-printing or pigment-dyeing process" cannot be applied to such heavyweight goods which would require too high costs for their wet after-treatment, with regard to the feel and pile of the fabric.

It has now been found that the above disadvantages known from prior art can be avoided, and prints and pad-dyeings fast to rubbing without requiring an after-treatment can be produced on nitrogen-containing fibrous materials by using printing pastes or padding baths which, in addition to dye-stuffs suitable for these fiber types as well as emulsion thickenings, contain aqueous dispersions of styrene homopolymers, and by fixing the prints and pad-dyeings by a treatment with steam and/or hot air and/or by exposure to radiation energy.

The prints and pad-dyeings obtained according to the invention do not require a wet after-treatment and they are distinguished by a good fastness to rubbing and a good resistance to shampoo-foam cleaning. Moreover, the finished prints do not bleed during storage either in the dry or in the wet state.

According to the process of the invention, the dyestuffs are applied to the goods by means of emulsion thickenings accordingly to usual methods, for example by printing or treating on a foulard at normal temperature. The printing inks or padding baths used consist of an aqueous dyestuff preparation which is emulsified in a readily volatile liquid hydrocarbon. These emulsions contain a non-polymerizable emulsifier advantageously in an amount of from 0.5 to 30% and a liquid hydrocarbon in an amount of from 5 to 25%, both calculated on the weight of the total emulsion (printing paste or padding liquor). In this emulsion the hydrocarbon forms the outer continuous phase and the aqueous dyestuff preparation forms the inner discontinuous phase. The thickenings are prepared in the manner usual for the production of water-in-oil emulsions.

For the oily phase any organic liquid may be utilized which is not miscible with water under the conditions of the emulsion preparation, for example aliphatic or aromatic hydrocarbons or mixtures of aliphatic and aromatic hydrocarbons with one another or among themselves. For practical reasons, commercial hydrocarbon mixtures, for example from mineral oil cracking, are used. Substances suitable for this purpose are known to those skilled in the art. To be useful for the preparation of the water-in-oil emulsions according to the invention, the hydrocarbons or mixtures thereof to be used have to fulfill the requirement that their boiling points are within the range of from 60° to 220° C., in order to prevent premature volatilization and to make possible a removal of the hydrocarbons during the dyeing or printing process.

Suitable emulsifiers for the process of the invention are the products disclosed in German Pats. Nos. 959,380 and 965,722. These products are non-film-forming substances, for example polycondensation products of ethylene oxide, propylene oxide or butylene oxide with aliphatic alcohols, alkyl-phenols or fatty acids, fatty acid esters of polyfunctional alcohols, salts of sulfonation products of petroleum or naphthenic acids as well as fatty acid amides.

The printing pastes and padding baths used according to the invention contain, in addition to the usual adjuvants chosen according to the dyestuff class used, also aqueous dispersions of styrene homopolymers in an amount of from 10 to 300 g. per kilogram or liter; the dispersions may further contain plasticizers and protective colloids, such as copolymers of vinyl acetate and maleic anhydride. The reduced specific viscosity of these high-molecular-weight compounds may vary within certain limits and is advantageously situated in a range of from 0.45 to 0.6 (determined as a 1%-solution in dimethylformamide at 25° C.).

The choice of the dyestuffs to be used in the process of the invention depends, above all, on the substrate to be dyed or printed and on the emulsifier used. The dyestuff chosen must have a sufficiently high affinity to the fiber and must be only sparingly, or not at all, soluble in the emulsifier used. In this connection, it is obvious that the large number of dyestuffs, emulsifiers and substrates does not permit the mention of a determined dyestuff class or list of dyestuffs. The solubility of the dyestuffs in the emulsifier can, therefore, only be determined by empirical methods.

Nitrogen-containing fibrous materials to be used according to the invention are, especially, materials on the basis of polyamide or polyurethane fibers, and the materials to be dyed or printed may comprise various forms of manufacturing, for example yarn, fabrics or carpet goods.

The dyestuffs applied to these nitrogen-containing fibrous materials with the aid of the printing pastes or padding baths of the invention can be fixed, advantageously after drying of the goods, by the following methods:

Treatment with hot air for 20 seconds to 10 minutes at temperatures of from 90° to 190° C. and/or steaming for 1 to 30 minutes at 101° to 102° C. and/or steaming for 1 to 30 minutes under an excess pressure of from 0.2 to 5 atmospheres gauge at 110° to 150° C. and/or by exposure to infra-red radiation having a wave length of from 2.3 to 5μ, preferably of 3μ, for 30 seconds to 10 minutes.

The following examples serve to illustrate the invention.

EXAMPLE 1

Carpet goods made of polyamide fiber material were printed with a printing paste which had been prepared per 1 kilogram, as follows:

20 g. of the 1:2-chromium complex compound of a dyestuff of the formula

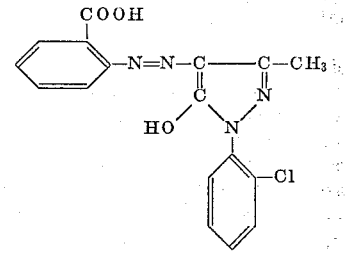

and 20 g. of thiourea were pasted up with 480 g. of water and the paste was dissolved while heating. After cooling, 60 g. of an aqueous dispersion (solids content about 50%) of a styrene homopolymer (reduced specific viscosity of the polymer: 0.53, determined as a 1%-solution in dimethylformamide at 25° C.), and 50 g. of formic acid (of 85% strength) were added to the solution. This solution was then added dropwise, while thoroughly stirring (at about 3,600 r.p.m.), to a mixture of the following composition: 215 g. of a water-in-oil emulsifier of the type of an esterification product of oleic acid and diglycerol, and 155 g. of a heavy gasoline (boiling range: 160°–200° C.).

Subsequently, the goods so treated were dried and, for dyestuff fixation, steam-treated for 20 minutes at 102° C. and then subjected to a hot air treatment at 160° C. for 10 minutes.

Yellow prints fast to rubbing without requiring a wet after-treatment were obtained.

EXAMPLE 2

A fabric made of polyamide fibers was printed with a printing paste prepared as disclosed in Example 1 but containing as the dyestuff an acid dyestuff of the formula

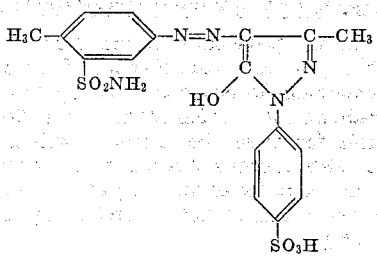

After the goods had been dried, the dyestuff applied was fixed only by a hot air treatment at 160° C. for 5 minutes.

Yellow prints fast to rubbing and which did not stain were obtained.

EXAMPLE 3

A fabric made of polyurethane fibers was printed with a printing paste prepared, per 1 kilogram, in the following manner:

20 g. of a mixture of about equal parts of the 1:2-cobalt complex compound of a reactvie dyestuff of the formula

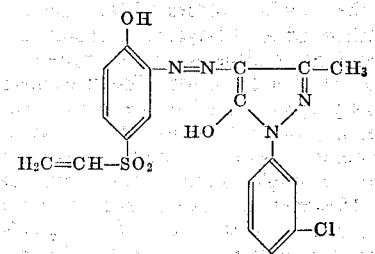

and of a reactive dyestuff of the formula

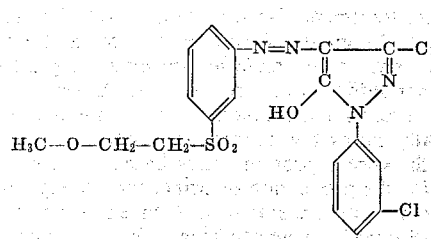

and 20 g. of thiourea were pasted up with 520 g. of water and the paste was dissolved while heating. After cooling, 60 g. of an aqueous dispersion (solids content about 50%) of a styrene homopolymer (reduced specific viscosity 0.53, determined as a 1%-solution in dimethylformamide at 25° C.) and 10 g. of sodium acetate were added to the solution.

This solution was then added dropwise, while thoroughly stirring (at about 3,600 r.p.m.), to a mixture of the following composition: 215 g. of a water-in-oil emulsifier of the type of an esterification product of oleic acid and diglycerol, and 155 g. of a heavy gasoline (boiling range: 160°–200° C.).

Subsequently, the goods thus treated were dried, and steam-treated at 102° C. for 10 minutes to achieve dyestuff fixation.

Yellow prints fast to rubbing without requiring a wet after-treatment were obtained.

We claim:

1. A process for the production of a print or a pad-dyeing fast to rubbing without after-treatment on a nitrogen-containing fibrous material containing polyamide or polyurethane fibers which comprises applying to said material an aqueous printing paste or a padding bath containing an acid dyestuff or a reactive dyestuff for said fibers, a water-in-oil emulsion thickening agent and an aqueous dispersion of a styrene homopolymer in an amount of from about 10 to about 300 grams per kilogram of printing paste or liter of padding bath, said styrene homopolymer having a reduced specific viscosity of about 0.45 to about 0.6 (determined as a 1% solution in dimethylformamide), and fixing the printed paste or padded bath with steam, hot air or radiation energy without other after-treatment fixing.

2. A process according to claim 1 wherein said water-in-oil emulsion contains about 0.5% to about 30% of a non-polymerizable emulsifier and about 5% to about 25% of a liquid hydrocarbon calculated on the weight of said emulsion.

3. A process according to claim 2 wherein said emulsifier is a non-film-forming polycondensation product of ethylene oxide, propylene oxide or butylene oxide with an aliphatic alcohol, alkyl-phenol or fatty acid, a fatty acid ester of a polyfunctional alcohol, a salt of a sulfonation product of petroleum or a naphthenic acid, or a fatty acid amide.

4. A process according to claim 2 wherein said liquid hydrocarbon is a readily volatile aliphatic or aromatic hydrocarbon having a boiling point of about 60° C. to about 220° C. or a mixture thereof.

5. A process according to claim 1 wherein said fixing is with air at about 90° C. to 190° C. for about 20 to 600 seconds, steam at about 101° C. to 102° C. for about 1 to 30 minutes, steam at about 110° C. to 150° C. at about 0.2 to 5 atmospheres gauge for about 1 to 30 minutes, or infrared radiation at about 2.3 to 5$\mu$ wavelengths for about 30 to 600 seconds.

References Cited
UNITED STATES PATENTS

| | | | |
|---|---|---|---|
| 2,691,005 | 10/1954 | Booth | 260—22 |
| 2,825,708 | 3/1958 | Auer | 260—22 |
| 2,663,696 | 12/1953 | Armatys | 260—29.4 |
| 2,594,899 | 4/1952 | Fordemwalt | 8—70 |
| 2,637,621 | 5/1953 | Auer | 8—69 |
| 3,093,602 | 6/1963 | Booth et al. | 260—17 |
| 2,825,707 | 3/1958 | Auer | 260—15 |

GEORGE F. LESMES, Primary Examiner

J. C. COOPER, Assistant Examiner

U.S. Cl. X.R.

8—62, 74; 260—29.6 R, 29.6 WO